United States Patent
Du et al.

(10) Patent No.: US 11,657,471 B2
(45) Date of Patent: May 23, 2023

(54) METHODS AND APPARATUS FOR CONSTANT DATA STORAGE

(71) Applicant: QUALCOMM Incorporated, San Diego, CA (US)

(72) Inventors: Yun Du, San Diego, CA (US); Andrew Evan Gruber, Arlington, MA (US); Chihong Zhang, San Diego, CA (US); Jian Jiang, San Diego, CA (US); Gang Zhong, San Diego, CA (US); Baoguang Yang, Fremont, CA (US); Yang Xia, San Diego, CA (US); Chun Yu, Rancho Santa Fe, CA (US); Eric Demers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/356,434

(22) Filed: Jun. 23, 2021

(65) Prior Publication Data
US 2022/0414814 A1    Dec. 29, 2022

(51) Int. Cl.
*G06T 1/20*    (2006.01)
*G06T 1/60*    (2006.01)

(52) U.S. Cl.
CPC . *G06T 1/20* (2013.01); *G06T 1/60* (2013.01)

(58) Field of Classification Search
CPC .............. G06T 1/20; G06T 1/60; G06T 15/80
USPC .................................................. 345/530, 426
See application file for complete search history.

(56) References Cited

U.S. PATENT DOCUMENTS

| | | | |
|---|---|---|---|
| 7,839,410 B1 * | 11/2010 | Brown .................... | G06T 15/04 345/541 |
| 7,852,345 B1 * | 12/2010 | Brown .................... | G06T 15/04 345/541 |
| 8,094,158 B1 | 1/2012 | Allen et al. | |
| 9,799,094 B1 * | 10/2017 | Chen .......................... | G06T 9/00 |
| 2016/0055608 A1 * | 2/2016 | Frascati ................ | G06T 15/005 345/522 |
| 2020/0175741 A1 * | 6/2020 | Gierach .................... | G06T 1/20 |
| 2021/0183005 A1 | 6/2021 | Du et al. | |

FOREIGN PATENT DOCUMENTS

WO    2022093462 A1    5/2022

OTHER PUBLICATIONS

International Search Report and Written Opinion—PCT/US2022/031197—ISA/EPO—dated Oct. 14, 2022.

\* cited by examiner

*Primary Examiner* — Jacinta M Crawford
(74) *Attorney, Agent, or Firm* — Procopio, Cory, Hargreaves & Savitch LLP

(57) ABSTRACT

The present disclosure relates to methods and devices for graphics processing including an apparatus, e.g., a GPU. The apparatus may generate a table including a plurality of entries to store data associated with at least one of a constant value or an immediate value. The apparatus may also process, upon generating the table, first data including at least one of a constant value or an immediate value. Further, the apparatus may store, in the generated table, at least one of the constant value or the immediate value of the first data. The apparatus may also transmit, upon storing at least one of the constant value or the immediate value in the table, the table including the stored at least one of the constant value or the immediate value of the first data.

25 Claims, 9 Drawing Sheets

METHODS AND APPARATUS FOR CONSTANT DATA STORAGE

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that can perform graphics processing. The apparatus may generate first data including at least one of a constant value or an immediate value. The apparatus may also generate a table including a plurality of entries to store data associated with at least one of a constant value or an immediate value. Additionally, the apparatus may process, upon generating the table, first data including at least one of a constant value or an immediate value. The apparatus may also store, in the generated table, at least one of the constant value or the immediate value of the first data. The apparatus may also transmit, upon storing at least one of the constant value or the immediate value in the table, the table including the stored at least one of the constant value or the immediate value of the first data. Moreover, the apparatus may skip processing, upon transmitting the table, at least one of the constant value or the immediate value of second data, where the second data is associated with at least one of the constant value or the immediate value. The apparatus may also process a portion of the second data, where the portion of the second data does not include at least one of the constant value or the immediate value. The apparatus may also read, upon transmitting the table, a portion of the second data. Further, the apparatus may remove, upon reading the portion of the second data, the table including the stored at least one of the constant value or the immediate value.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
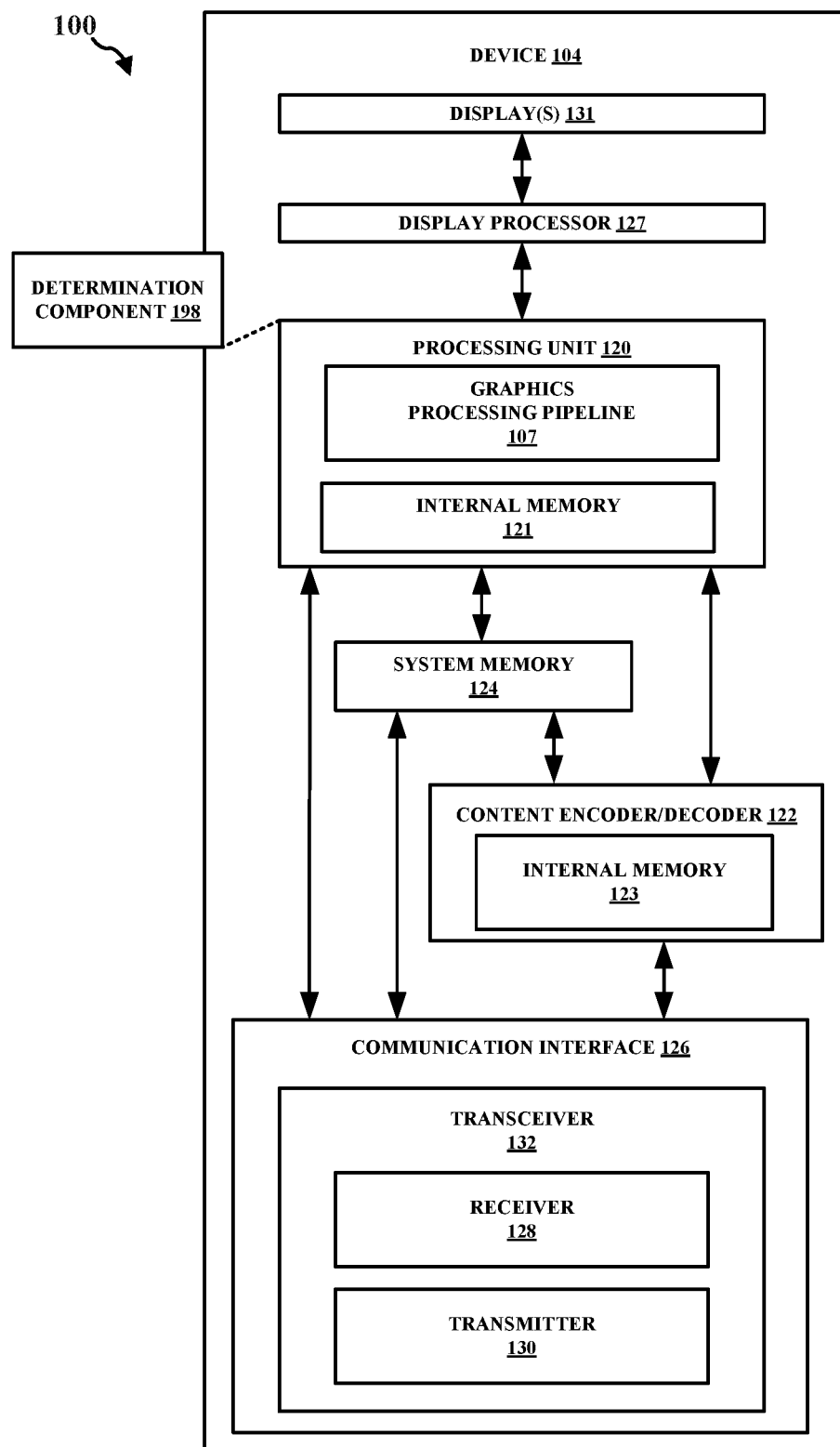
FIG. 1 is a block diagram that illustrates an example content generation system in accordance with one or more techniques of this disclosure.

Aspects of graphics processing may utilize a number of different shading applications at a graphics processing unit (GPU). These shading applications may utilize one or more shaders that are associated with one or more constant components or values. For example, in gaming applications, there are number of shaders that may include one or more constant components for a render target (RT) surface. In some instances, when a color component is a constant value or an immediate value, a compiler may use additional instructions (e.g., move instructions) and/or extra general purpose register (GPR) space to store data (e.g., RT data). This may result in redundant GPR read/write steps, and the streaming processor (SP) may be forced to send the output to the render backend (RB) as the result. Accordingly, these additional move instructions and/or extra GPR space may result in wasteful and redundant GPR read/write steps. Aspects of the present disclosure may reduce the amount of instructions/data that is transmitted based on constant values or immediate values. Moreover, aspects of the present disclosure may reduce the amount of GPR space that is utilized to store data associated with constant values or immediate values. Aspects of the present disclosure may also reduce the amount of GPR read/write steps associated with constant values or immediate values. For example, aspects of the present disclosure may reduce the amount of data that is transmitted from an SP to an RB based on GPR read/write steps.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to generate first data including at least one of a constant value or an immediate value. The determination component 198 may also be configured to generate a table including a plurality of entries to store data associated with at least one of a constant value or an immediate value. The determination component 198 may also be configured to process, upon generating the table, first data including at least one of a constant value or an immediate value. The determination component 198 may also be configured to store, in the generated table, at least one of the constant value or the immediate value of the first data. The determination component 198 may also be configured to transmit, upon storing at least one of the constant value or the immediate value in the table, the table including the stored at least one of the constant value or the immediate value of the first data. The determination component 198 may also be configured to skip processing, upon transmitting the table, at least one of the constant value or the immediate value of second data, where the second data is associated with at least one of the constant value or the immediate value. The determination component 198 may also be configured to process a portion of the second data, where the portion of the second data does not include at least one of the constant value or the immediate value. The determination component 198 may also be configured to read, upon transmitting the table, a portion of the second data. The determination component 198 may also be configured to remove, upon reading the portion of the second data, the table including the stored at least one of the constant value or the immediate value. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
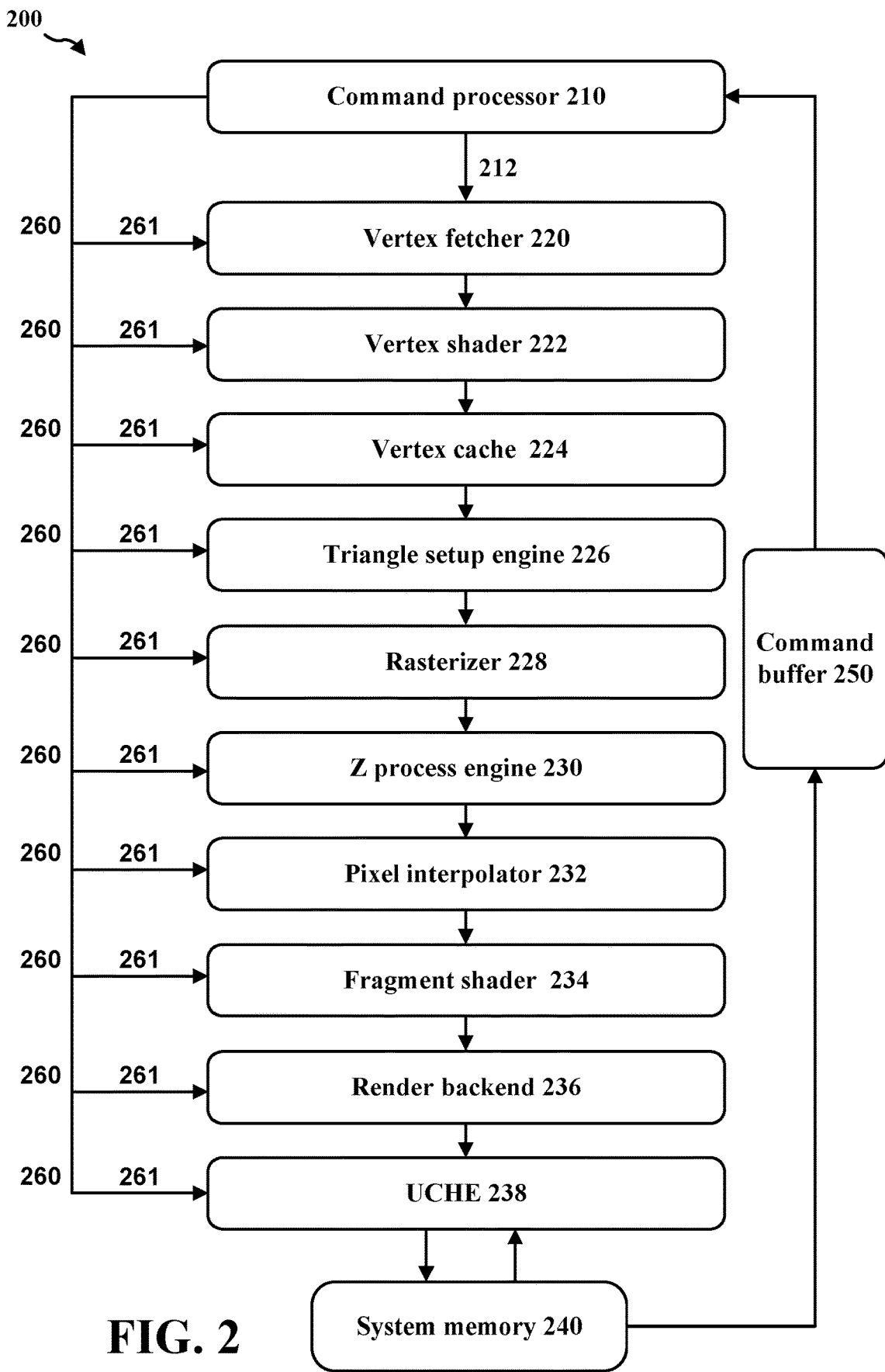
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified. In contrast to tiled rendering, direct rendering does not divide the frame into smaller bins or tiles. Rather, in direct rendering, the entire frame is rendered at a single time. Additionally, some types of GPUs can allow for both tiled rendering and direct rendering.

In some aspects, GPUs can apply the drawing or rendering process to different bins or tiles. For instance, a GPU can render to one bin, and perform all of the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
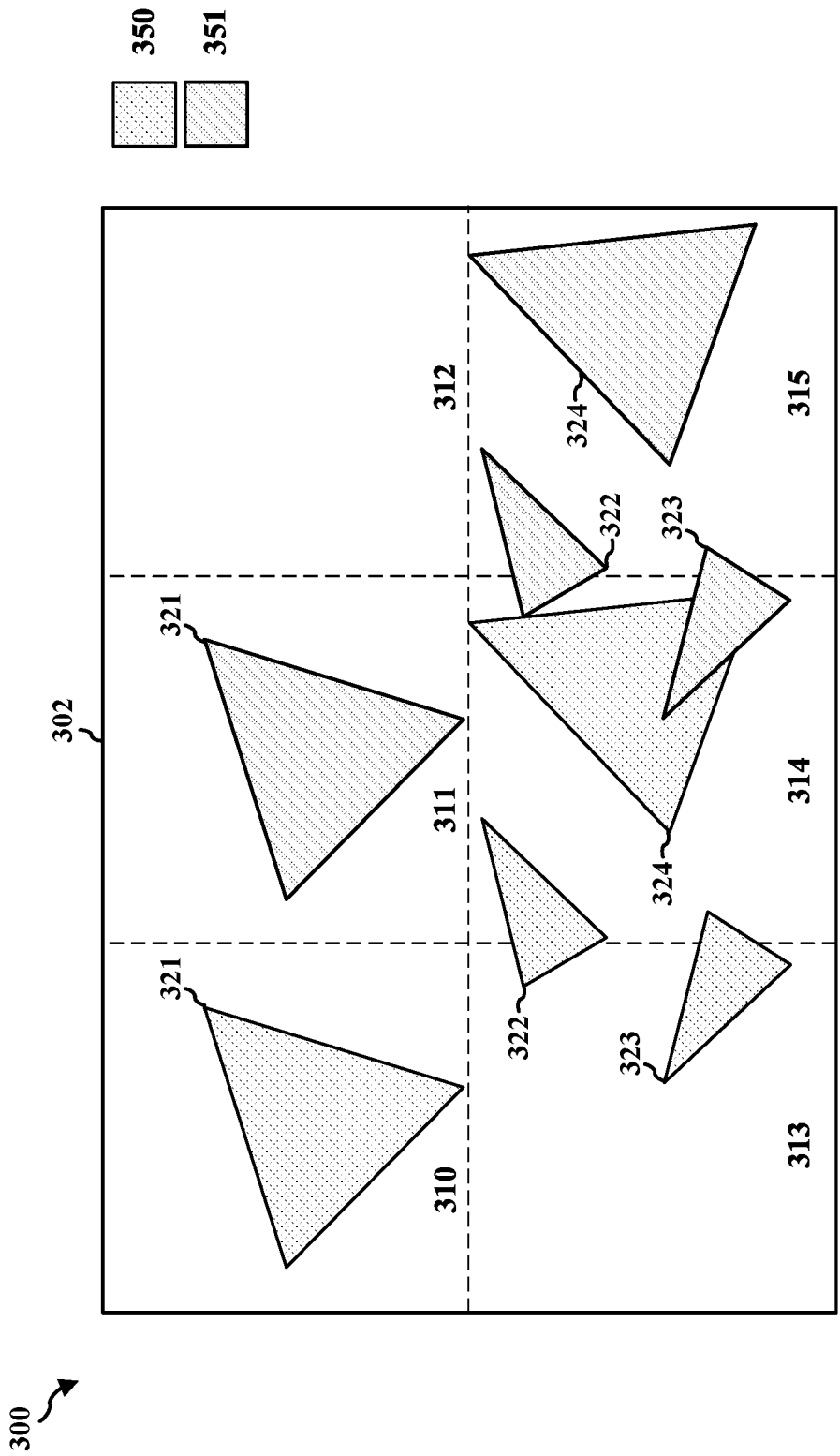
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

Figure 4:
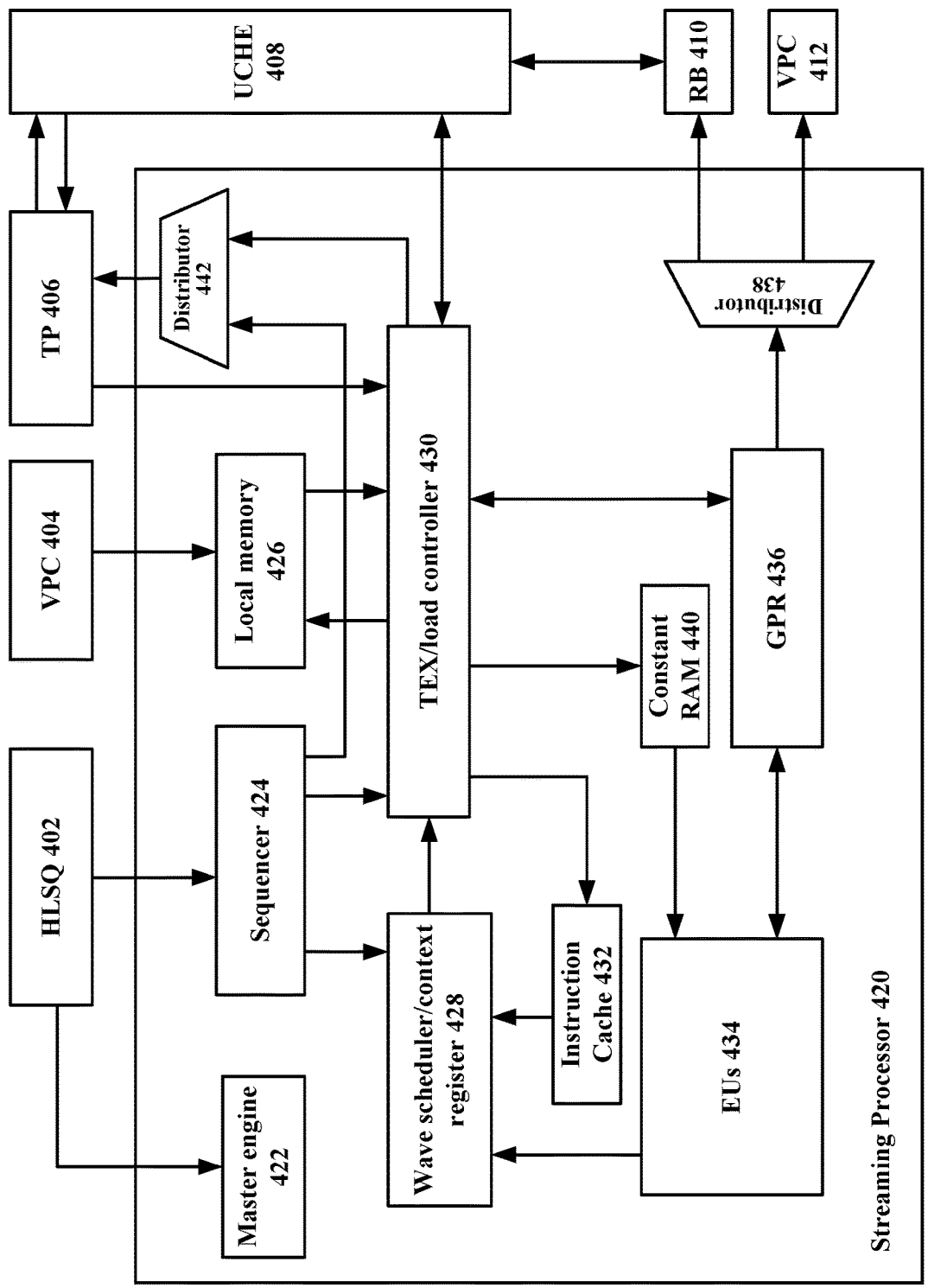
FIG. 4 is a diagram illustrating an example GPU in accordance with one or more techniques of this disclosure.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles FIG. 4 illustrates an example GPU 400. More specifically, FIG. 4 illustrates a streaming processor (SP) system in GPU 400. As shown in FIG. 4, GPU 400 includes high level sequencer (HLSQ) 402, VPC 404, texture processor (TP) 406, UCHE 408, RB 410, and VPC 412. GPU 400 also includes SP 420, master engine 422, sequencer 424, local memory 426, wave scheduler and context register 428, texture (TEX) or load controller 430, instruction cache 432, execution units (EUs) 434, general purpose register (GPR) 436, output distributor 438, constant RAM 440, and texture distributor 442. The wave scheduler and context register 428 may include one or more wave slots.

As shown in FIG. 4, the SP 420 may include traditional function units or blocks, e.g., EUs 434 or sequencer 424. EUs 434 may execute or process some of the desired functions of the GPU. The sequencer 424 may allocate resources and local memory. Also, the sequencer 424 may allocate wave slots and any associated GPR 436 space. For example, the sequencer 424 may allocate wave slots or GPR 436 space when the HLSQ 402 issues a pixel tile workload to the SP 420. In some aspects, the wave scheduler 428 may execute a pixel shader or issue instructions to the EUs 434. The EUs 434 may also include an arithmetic logic unit (ALU) and/or an elementary function unit (EFU). Further, the TEX or load controller 430 may be considered an execution unit.

Moreover, the TEX or load controller 430 may correspond to one or more units. For instance, the TEX 430 may perform a texture fetch and/or the load controller 430 may perform a memory fetch. In some aspects, the instruction cache 432 may store a program to be executed. Also, the constant RAM 440 may store the constant that may be needed for a constant or uniform formation. As further shown in FIG. 4, the SP 420 may interface with the outside blocks, e.g., HLSQ 402, VPC 404, TP 406, UCHE 408, RB 410, and VPC 412. These blocks 402-412 may utilize user provided input and/or the SP may output results to these blocks or memory access.

As shown in FIG. 4, each unit or block in GPU 400 may send data or information to other blocks. For instance, HLSQ 402 may send commands to the master engine 422. Also, HLSQ 402 may send vertex threads, vertex attributes, pixel threads, and/or pixel attributes to the sequencer 424. VPC 404 may send certain coefficients to local memory 426. TP 406 may send texture data to the TEX 430. TP 406 may also receive texture requests from TEX 430, e.g., via texture distributor 442, and bypass requests from local memory 426. Further, TP 406 may send requests to and receive texture elements (texels) from UCHE 408. UCHE 408 may also send memory to and receive memory from TEX 430, as well as send memory to and receive memory from RB 410. Also, RB 410 may receive an output in the form of color from GPR 436, e.g., via output distributor 438. VPC 412 may also receive output in the form of vertices from GPR 436, e.g., via output distributor 438. GPR 436 may also send temporary data to and receive temporary data from EUs 434. Moreover, EUs 434 may send address or predicate information to the wave scheduler 428, as well as receive constant data from constant RAM 440. TEX or load controller 430 may also send/receive load or store data to/from GPR 436, as well as send store data to, and receive load data from, local memory 426. Further, TEX or load controller 430 may send global data to constant RAM 440 and update information to the instruction cache 432. TEX or load controller 430 may also receive attribute data from sequencer 424 and synchronization information from wave scheduler 428. Additionally, wave scheduler 428 may receive decode information from instruction cache 432 and thread data from sequencer 424.

Figure 5:
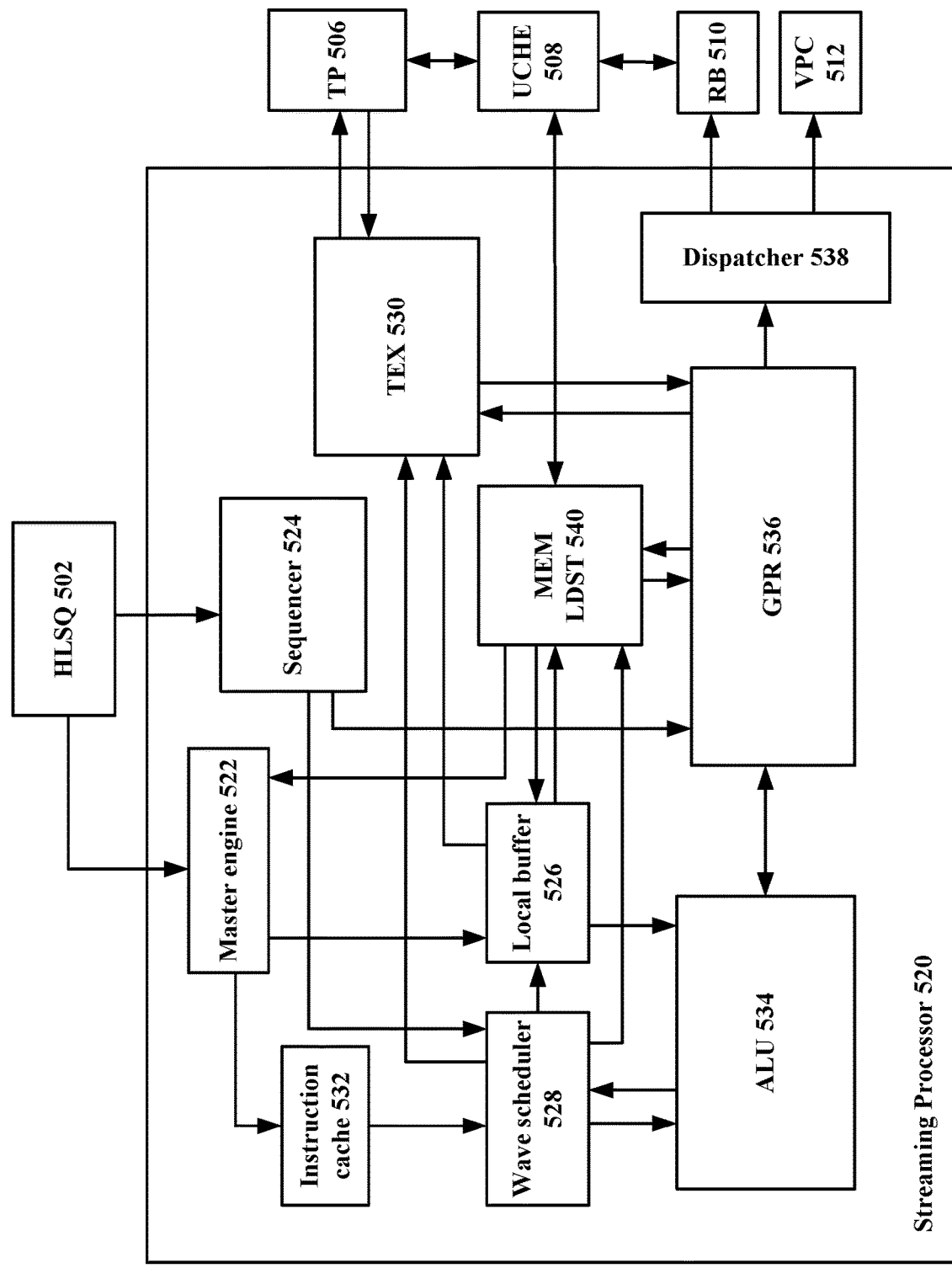
FIG. 5 is a diagram illustrating an example GPU in accordance with one or more techniques of this disclosure.

FIG. 5 illustrates an example GPU 500. As shown in FIG. 5, GPU 500 is similar to GPU 400 in FIG. 4, but GPU 500 includes a few different components. More specifically, FIG. 5 illustrates a streaming processor (SP) system in GPU 500. As shown in FIG. 5, GPU 500 includes HLSQ 502, TP 506, UCHE 508, RB 510, and VPC 512. GPU 500 also includes SP 520, master engine 522, sequencer 524, local buffer 526, wave scheduler 528, texture (TEX) 530, instruction cache 532, ALU 534, GPR 536, dispatcher 538, and memory (MEM) load store (LDST) 540.

As shown in FIG. 5, each unit or block in GPU 500 may send data or information to other blocks. For instance, HLSQ 502 may send commands to the master engine 522. Also, HLSQ 502 may send vertex threads, vertex attributes, pixel threads, pixel attributes, and/or compute commands to the sequencer 524. TP 506 may receive texture requests from TEX 530, and send texture elements (texels) back to the TEX 530. Further, TP 506 may send memory read requests to and receive memory data from UCHE 508. UCHE 508 may also receive memory read or write requests from MEM LDST 540 and send memory data back to MEM LDST 540, as well as receive memory read or write requests from RB 510 and send memory data back to RB 510. Also, RB 510 may receive an output in the form of color from GPR 536, e.g., via dispatcher 538. VPC 512 may also receive output in the form of vertices from GPR 536, e.g., via dispatcher 538. GPR 536 may send address data or receive write back data from MEM LDST 540. GPR 536 may also send temporary data to and receive temporary data from ALU 534. Moreover, ALU 534 may send address or predicate information to the wave scheduler 528, as well as receive instructions from wave scheduler 528. Local buffer 526 may send constant data to ALU 534. TEX 530 may also receive texture attributes from or send texture data to GPR 536, as well as receive constant data from local buffer 526. Further, TEX 530 may receive texture requests from wave scheduler 528, as well as receive constant data from local buffer 526. MEM LDST 540 may send/receive constant data to/from local buffer 526. Sequencer 524 may send wave data to wave scheduler 528, as well as send data to GPR 536. Master engine 522 may send program data to instruction cache 532, as well as send constant data to local buffer 526 and receive instructions from MEM LDST 540. Instruction cache 532 may send instructions or decode information to wave scheduler 528. Wave scheduler 528 may send read requests to local buffer 526, as well as send memory requests to MEM LDST 540.

As shown in FIG. 5, the high level sequencer (HLSQ) 502 may prepare one or more context states for the streaming processor (SP) 520. For example, the HLSQ 502 may prepare the context states for different types of data, e.g., global register data, shader constant data, buffer descriptors, instructions, etc. Additionally, the HLSQ 502 may embed context states into a command stream to the SP 520. The master engine 522 may parse the command stream from the HLSQ 502 and setup an SP global state. Moreover, the master engine 522 may fill or add to an instruction cache 532 and/or a local buffer 526 or a constant buffer.

In some aspects, inside the HLSQ 502, there may be an internal function unit called a state processor. The state processor may be a single fiber scalar processor that may execute a special shader program, e.g., a preamble shader. The preamble shader may be generated by the GPU compiler in order to load constant data from different buffer objects. Also, the preamble shader may bind the buffer objects into a single constant buffer, such as a post-process constant buffer. Further, the HLSQ 502 may execute the preamble shader and, as a result, skip utilizing a main shader. In some instances, the main shader may perform different shading tasks, such as normal vertex shading and/or a fragment shading program.

Additionally, as shown in FIG. 5, the SP 520 may not be limited to executing a preamble if the HLSQ 502 decides to skip a preamble execution. For instance, the SP 520 may also process a conventional graphics workload, such as vertex shading and/or fragment shading. In some aspects, the SP 520 may utilize its execution units and storage in order to process compute tasks as a general purpose GPU (GPGPU). Inside the SP 520, there may be multiple parallel instruction execution units such as an ALU, EFU, branching unit, TEX, general memory read and write (aka LDST), etc. The SP 520 may also include on-chip storage memory, such as a general purpose register (GPR) 536 which may store per-fiber private data. Also, the SP 520 may include a local buffer 526 which stores per-shader or per-kernel constant data, per-wave uniform data (aka uGPR), and per-compute work group (WG) local memory (LM).

Moreover, as shown in FIG. 5, dispatcher 538 may fetch data from GPR 536. Dispatcher 538 may also perform format conversion, and then dispatch a final color to multiple render targets (RTs). Each RT may have one or more components, such as red (r) green (G) blue (B) alpha (A) (RGBA) data, or just an alpha component of the RGBA data. Further, each RT may be generally stored in a vector GPR, i.e., R3.0 may store red data, R3.1 may store green data, R3.2 may store blue data, etc. Also, a driver program in an SP context register may be utilized to define the GPR identifier (ID) which stores RT data.

A number of different shading applications at a GPU may utilize one or more shaders that are associated with one or more constant components or values. For example, in gaming applications, there are number of shaders that may include one or more constant components for a render target (RT) surface. In some instances, when a color component is a constant value or an immediate value, a compiler may use additional instructions (e.g., move instructions) and/or extra GPR space to store data (e.g., RT data). This may result in redundant GPR read/write steps, and the SP may be forced to send the output to the RB as the result. Accordingly, these additional move instructions and/or extra GPR space may result in wasteful and redundant GPR read/write steps.

Based on the above, it may be beneficial to reduce the amount of instructions/data that is transmitted based on constant values or immediate values. Further, it may be beneficial to reduce the amount of GPR space that is utilized to store data associated with constant values or immediate values. That is, it may be beneficial to reduce the amount of GPR read/write steps associated with constant values or immediate values. For instance, it may be beneficial to reduce the amount of data that is transmitted from an SP to an RB based on GPR read/write steps.

Aspects of the present disclosure may reduce the amount of instructions/data that is transmitted based on constant values or immediate values. Moreover, aspects of the present disclosure may reduce the amount of GPR space that is utilized to store data associated with constant values or immediate values. Aspects of the present disclosure may also reduce the amount of GPR read/write steps associated with constant values or immediate values. For example, aspects of the present disclosure may reduce the amount of data that is transmitted from an SP to an RB based on GPR read/write steps.

Additionally, aspects of the present disclosure may utilize a preamble shader and convert redundant move instructions to alias instructions. For instance, instead of using move instructions in the main shader which executes on a per-fiber basis, aspects of the present disclosure may utilize the preamble shader and convert redundant move instructions to alias instructions. As such, aspects of the present disclosure may convert or rename instructions from move instructions to alias instructions. Aspects of the present disclosure may also convert alias RT output registers to constant data. Further, as mentioned previously, aspects of the present disclosure may utilize a preamble to reduce an amount of execution, e.g., execute once per shader program. In order to do so, aspects of the present disclosure may build an alias table to be transmitted from one GPU block to another GPU block, e.g., from an SP to an RB.

In some instances, render target (RT) data, e.g., an output color, that is sent from an SP to an RB may be a constant, e.g., a constant value or an immediate value. For example, the alpha component of RGBA data may be set to a constant value or immediate value, e.g., 0 or 1, as the output is defined in the GPR. Also, the value for the alpha component may be vectorized, so the result may be determined from another value, e.g., R0, R1, R2. As such, the constant value or the immediate value may be moved to another value, e.g., R3, which corresponds to an additional move instruction. Further, each pixel to be rendered may include a similar alpha value, so the transmission of all of the alpha values may be redundant. For example, each of the alpha values may be transmitted to a downstream block to be processed, which may be redundant if each of the alpha values are identical.

Aspects of the present disclosure may eliminate the need to transmit each of the constant values to a downstream block to be processed. For instance, aspects of the present disclosure may reduce the amount of redundant data transmission, e.g., constant/immediate values. That is, aspects of the present disclosure may build an alias table, e.g., to be transmitted from an SP to an RB, that may store the constant/immediate values for each pixel to be rendered. In the alias table, the constant/immediate value for each pixel may be represented by a single entry in the table that corresponds to a single value, e.g., R3. This alias table may then be transmitted to a downstream block for processing, e.g., an RB. By utilizing the alias table to store all of the constant/immediate values for all of the pixels, the GPR may not be needed to store the constant/immediate values for each pixel. So aspects of the present disclosure may utilize a single entry in an alias table to store one value corresponding to the constant/immediate values for all pixels, rather than store every constant/immediate value for all pixels in a GPR. That is, aspects of the present disclosure may reduce the amount of data transmission and storage for constant/immediate values. As such, aspects of the present disclosure may mitigate the transmission and storage of unnecessary data/instructions in a GPU. Accordingly, aspects of the present disclosure may increase the processing speed or capability of a GPU, as well as reduce the amount of data storage in a GPU.

In some aspects, the alias table may be generated and transmitted, e.g., from the SP to the RB, before any pixel is rendered. After the RB receives the alias table from the SP, the RB may determine that the one or more components of RGBA data correspond to a constant/immediate value. When the SP later sends the render target (RT) data (e.g., color data) for each pixel, the RB may be able to skip the constant component of the data (e.g., the alpha component of the RGBA data) during processing, as the RB may already have the constant values from the previously transmitted alias table. That is, the alias table may allow the RB to process the render target data (e.g., color data) in a reduced amount of time. This may also allow aspects of the present disclosure to reduce the amount of reading/writing of data to the GPR.

The aforementioned alias table may be applied to any application of constant data transmission in a GPU, e.g., color data. For instance, aspects of the present disclosure may output constant data in a certain format, e.g., RGBA data, and the alias table that is previously transmitted may include corresponding values for the constant data. This constant data may be vectorized and/or transmitted between blocks in a GPU pipeline, e.g., transmitted from an SP to an RB. Also, aspects of the present disclosure may execute the corresponding instruction in order to move the constant value to the alias table or RT alias table. So aspects of the present disclosure may generate an alias table in order to store the constant/immediate value of a corresponding instruction.

As mentioned previously, when data is processed or executed in a GPU pipeline, e.g., a shading instruction, constant/immediate values associated with the data may be stored within the GPU for later use. In previous approaches, these constant/immediate values were stored in the GPR, which unnecessarily utilized valuable GPR space. Aspects of the present disclosure may generate an RT alias table in order to store these constant/immediate values. By doing so, aspects of the present disclosure may not need to utilize GPR space in order to store the constant/immediate values, thereby saving valuable GPR space. Further, as the RT alias table may be transmitted from the SP to the RB, the RB may utilize the constant/immediate values stored in the alias table during further processing. As the constant/immediate values may be represented by a single entry in the table, the RB may save time during processing retrieving the constant/immediate values. Accordingly, aspects of the present disclosure may reduce the amount of GPR space needed to store constant/immediate values, as well as reduce the processing time for data associated with constant/immediate values.

As mentioned above, aspects of the present disclosure may convert or rename certain instructions from move instructions to alias instructions. By utilizing alias instructions, rather than move instructions, aspects of the present disclosure may change the code or pseudocode associated with the instructions, where the code may be generated by the compiler. For example, aspects of the present disclosure may utilize the following compiler-generated code:

```
shps                //preamble start
...
alias RT3.x, C9.x   //4th RT x component
alias RT0.xyzw, 0.0 //1st RT xyzw component
alias RT1.xyzw, 0.0 //2nd RT xyzw component
alias RT2.xyzw, 0.0 //3rd RT xyzw component
alias RT4.xyzw, 0.0 //5th RT xyzw component
alias RT5.xyzw, 0.0 //6th RT xyzw component
alias RT6.xyzw, 0.0 //7th RT xyzw component
alias RT7.xyzw, 0.0 //7th RT xyzw component
shpe                //preamble end
```

As shown in the example code above, each of the RT related move instructions may be eliminated from the instructions. Further, the amount of GPR space used to store these immediate/constant RT components may also be reduced or eliminated. As such, aspects of the present disclosure may reduce the amount of storage space used to process data/instructions for constant values or immediate values.

In some aspects of the present disclosure, an SP may create a new table, e.g., an RT alias table, to store constant or immediate values. For instance, when a dispatcher fetches data from a GPR, it may first look at the RT alias table to determine if there are constant or immediate values. If there are constant or immediate values, the dispatcher may skip a GPR read. By doing so, the dispatcher may not spend cycles to fetch constant or immediate RT components. Accordingly, this process may improve the performance of a GPU, as well as reduce the amount of unnecessary processing steps. Further, the aforementioned table, e.g., an RT alias table, may enable another power or performance enhancement when an SP dispatches RT data to an RB. For instance, instead of passing constant/immediate components to an RB per pixel or fiber, the SP may pass the alias table to the RB once per drawcall. By doing so, the SP may skip a per pixel/fiber constant transition. As such, aspects of the present disclosure may reduce the amount of unnecessarily transferred data, which may also improve the speed and performance of the GPU.

Figure 6:
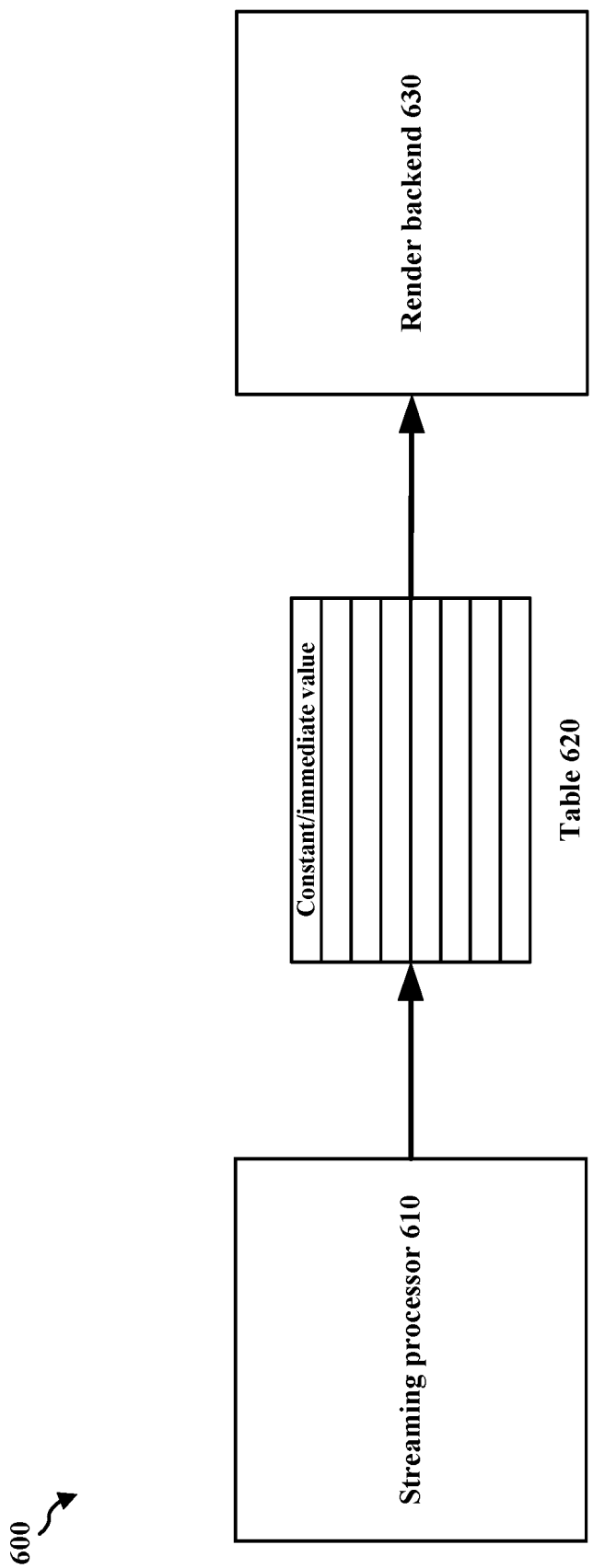
FIG. 6 is a diagram illustrating an example streaming processor, table, and render backend in accordance with one or more techniques of this disclosure.

FIG. 6 is a diagram 600 of a streaming processor (SP) 610, a table 620 (e.g., an RT alias table), and a render backend (RB) 630 in a GPU. As shown in FIG. 6, SP 610 may generate table 620 including a plurality of entries to store data associated with at least one of a constant value or an immediate value. The SP 610 may process first data including at least one of a constant value or an immediate value. The SP 610 may also store, in the table 620, at least one of the constant value or the immediate value of the first data. The SP 610 may also transmit the table 620 including the stored at least one of the constant value or the immediate value of the first data. Moreover, the GPU (e.g., SP 610 or RB 630) may skip processing at least one of the constant value or the immediate value of second data, where the second data is associated with at least one of the constant value or the immediate value. The GPU (e.g., SP 610 or RB 630) may also process a portion of the second data, where the portion of the second data does not include at least one of the constant value or the immediate value. The RB 630 may also read a portion of the second data. Further, the RB 630 may remove, upon reading the portion of the second data, the table 620 including the stored at least one of the constant value or the immediate value.

The aforementioned output aliasing process of aspects of the present disclosure provides an efficient manner in which to improve the performance of a GPU, as well as reduce the amount of GPR space utilized at a GPU. For instance, aspects of the present disclosure may provide a power and performance efficient manner in which a compiler may eliminate redundant move instructions. For example, by utilizing aspects of the present disclosure, the area cost delta for GPUs may be close to nothing. Aspects of the present disclosure may also reduce a GPR footprint and reduce the GPR read/write access for constant/immediate RT components. Moreover, aspects of the present disclosure may reduce the amount of data/instructions transmitted from an SP to an RB, e.g., per pixel/fiber.

Figure 7:
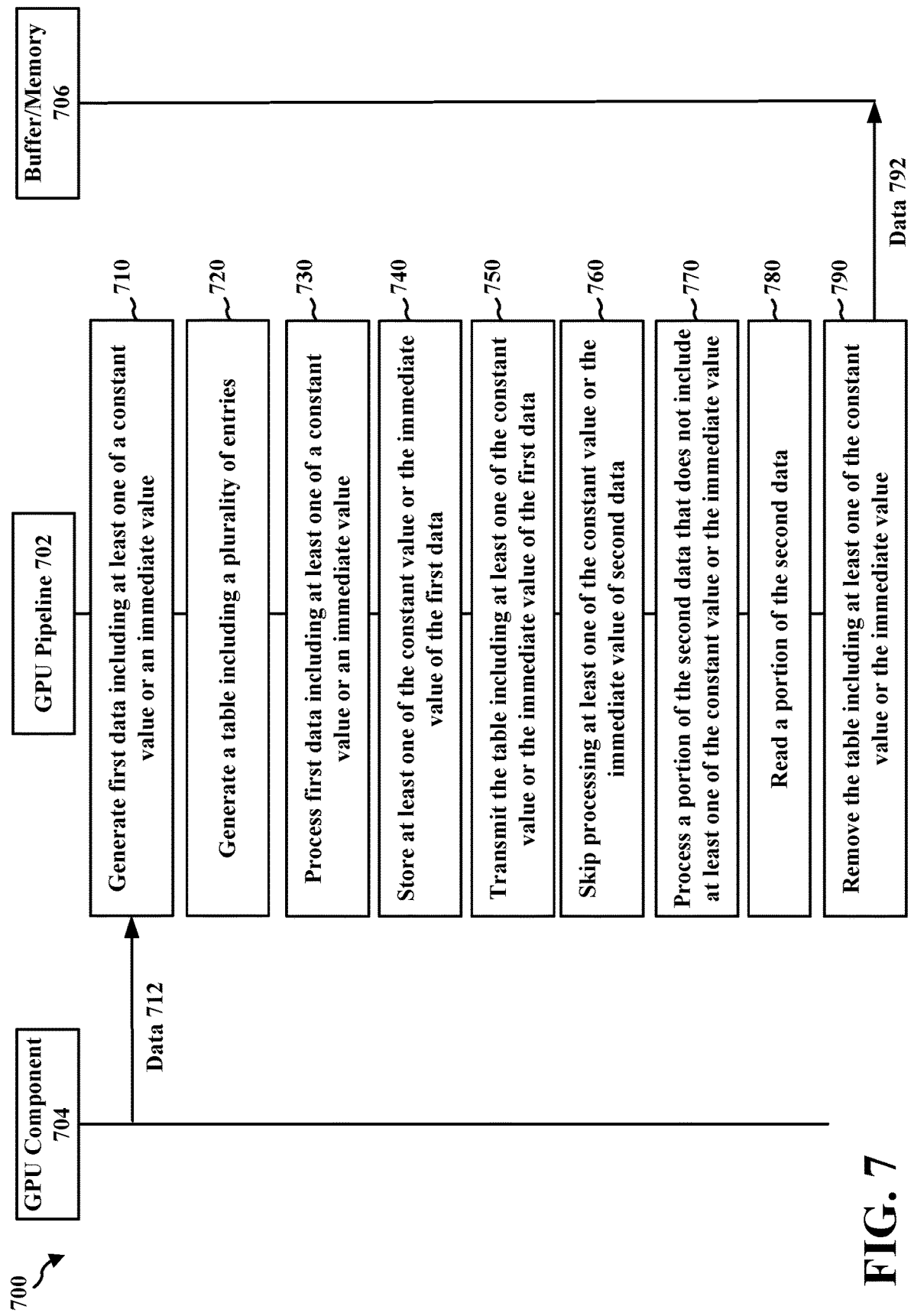
FIG. 7 is a communication flow diagram illustrating example communications between a GPU pipeline, a GPU component, and a memory/buffer in accordance with one or more techniques of this disclosure.

FIG. 7 is a communication flow diagram 700 of graphics processing in accordance with one or more techniques of this disclosure. As shown in FIG. 7, diagram 700 includes example communications between GPU pipeline 702 (e.g., an SP or RB in a GPU pipeline), GPU component 704 (e.g., another component in a GPU pipeline), and buffer or memory 706, in accordance with one or more techniques of this disclosure.

At 710, GPU pipeline 702 may generate first data including at least one of a constant value or an immediate value. The first data may be generated by a compiler. The first data may correspond to red (R) green (G) blue (B) alpha (A) (RGBA) data, and the constant value or immediate value may correspond to an alpha component of the RGBA data. In some aspects, the first data, e.g., data 712, may be received from another GPU component, e.g., GPU component 704.

At 720, GPU pipeline 702 may generate a table including a plurality of entries to store data associated with at least one of a constant value or an immediate value. The table may be a render target (RT) alias table. In some instances, each entry of the plurality of entries in the table may correspond to data that is distinct from other entries of the plurality of entries in the table, such that one entry in the table may include data that is dissimilar to another entry in the table. The data in each of the plurality of entries may be associated with data transmitted from a streaming processor (SP) to another component in a GPU.

At 730, GPU pipeline 702 may process, upon generating the table, first data including at least one of a constant value or an immediate value. The first data may be processed by a streaming processor (SP) or a high level sequencer (HLSQ) in a GPU. If the HLSQ processes the first data, the first data may be transmitted to the SP.

At 740, GPU pipeline 702 may store, in the generated table, at least one of the constant value or the immediate value of the first data.

At 750, GPU pipeline 702 may transmit, upon storing at least one of the constant value or the immediate value in the table, the table including the stored at least one of the constant value or the immediate value of the first data. The table including at least one of the constant value or the immediate value may be transmitted to at least one of a render backend (RB) or a vertex parameter cache (VPC) in a GPU.

At 760, GPU pipeline 702 may skip processing, upon transmitting the table, at least one of the constant value or the immediate value of second data, where the second data is associated with at least one of the constant value or the immediate value.

At 770, GPU pipeline 702 may process a portion of the second data, where the portion of the second data does not include at least one of the constant value or the immediate value. The portion of the second data may not include a preamble of the second data, such that the preamble of the second data may not be processed. Also, the first data and the second data may be processed in different portions of a graphics processing unit (GPU).

At 780, GPU pipeline 702 may read, upon transmitting the table, a portion of the second data. The portion of the second data may not include at least one of the constant value or the immediate value. In some aspects, the second data, e.g., data 792, may be stored in a buffer or memory, e.g., buffer/memory 706.

At 790, GPU pipeline 702 may remove, upon reading the portion of the second data, e.g., data 792, the table including the stored at least one of the constant value or the immediate value.

Figure 8:
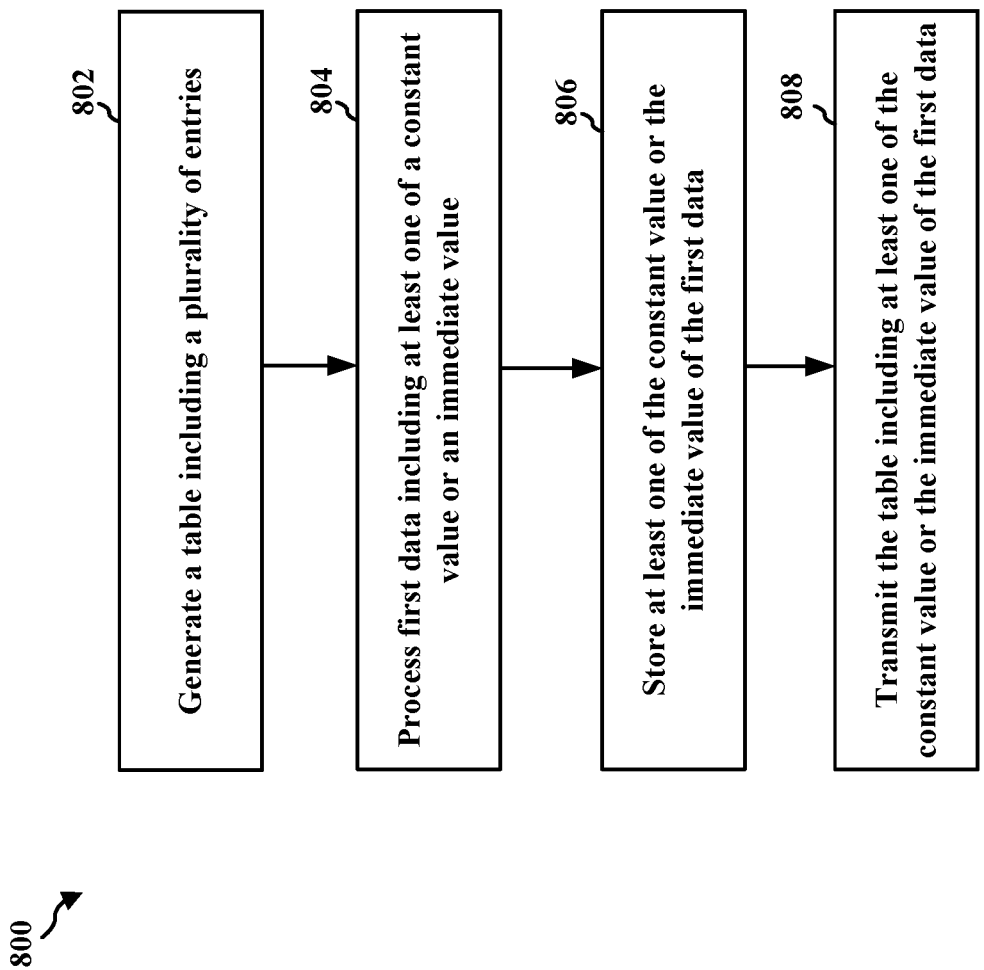
FIG. 8 is a flowchart of an example method of graphics processing in accordance with one or more techniques of this disclosure.

FIG. 8 is a flowchart 800 of an example method of graphics processing in accordance with one or more techniques of this disclosure. The method may be performed by an apparatus, such as an apparatus for graphics processing, a GPU, another graphics processor, a GPU pipeline, a wireless communication device, and/or any apparatus that can perform graphics processing as used in connection with the examples of FIGS. 1-7.

At 802, the apparatus may generate a table including a plurality of entries to store data associated with at least one of a constant value or an immediate value. For example, as described in 720 of FIG. 7, GPU pipeline 702 may generate a table including a plurality of entries to store data associated with at least one of a constant value or an immediate value. Further, processing unit 120 in FIG. 1 may perform step 802. The table may be a render target (RT) alias table. In some instances, each entry of the plurality of entries in the table may correspond to data that is distinct from other entries of the plurality of entries in the table, such that one entry in the table may include data that is dissimilar to another entry in the table. The data in each of the plurality of entries may be associated with data transmitted from a streaming processor (SP) to another component in a GPU.

At 804, the apparatus may process, upon generating the table, first data including at least one of a constant value or an immediate value. For example, as described in 730 of FIG. 7, GPU pipeline 702 may process, upon generating the table, first data including at least one of a constant value or an immediate value. Further, processing unit 120 in FIG. 1 may perform step 804. The first data may be processed by a streaming processor (SP) or a high level sequencer (HLSQ) in a GPU. If the HLSQ processes the first data, the first data may be transmitted to the SP.

At 806, the apparatus may store, in the generated table, at least one of the constant value or the immediate value of the first data. For example, as described in 740 of FIG. 7, GPU pipeline 702 may store, in the generated table, at least one of the constant value or the immediate value of the first data. Further, processing unit 120 in FIG. 1 may perform step 806.

At 808, the apparatus may transmit, upon storing at least one of the constant value or the immediate value in the table, the table including the stored at least one of the constant value or the immediate value of the first data. For example, as described in 750 of FIG. 7, GPU pipeline 702 may transmit, upon storing at least one of the constant value or the immediate value in the table, the table including the stored at least one of the constant value or the immediate value of the first data. Further, processing unit 120 in FIG. 1 may perform step 808. The table including at least one of the constant value or the immediate value may be transmitted to at least one of a render backend (RB) or a vertex parameter cache (VPC) in a GPU.

Figure 9:
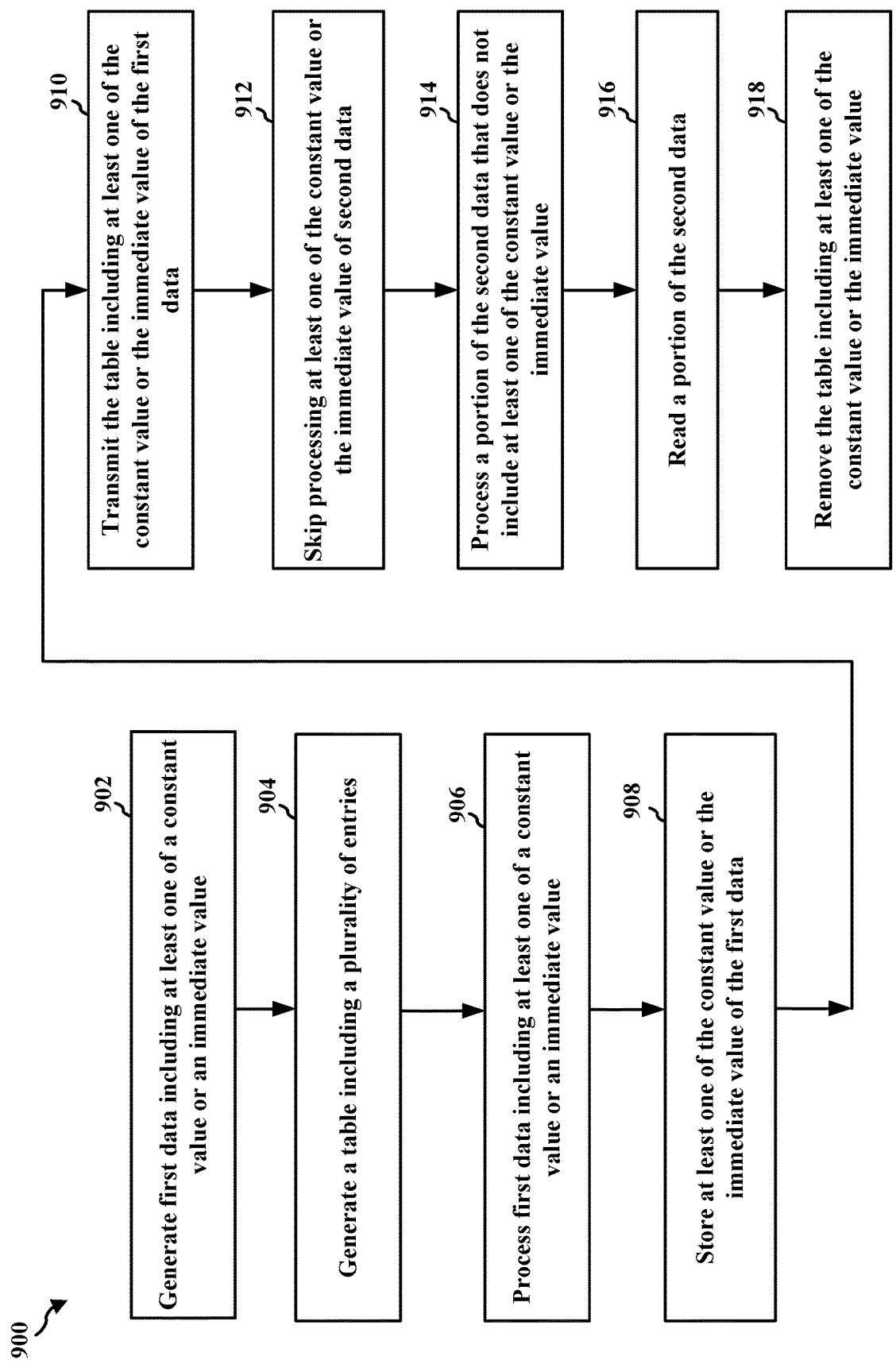
FIG. 9 is a flowchart of an example method of graphics processing in accordance with one or more techniques of this disclosure.

FIG. 9 is a flowchart 900 of an example method of graphics processing in accordance with one or more techniques of this disclosure. The method may be performed by an apparatus, such as an apparatus for graphics processing, a GPU, another graphics processor, a GPU pipeline, a wireless communication device, and/or any apparatus that can perform graphics processing as used in connection with the examples of FIGS. 1-7.

At 902, the apparatus may generate first data including at least one of a constant value or an immediate value. For example, as described in 710 of FIG. 7, GPU pipeline 702 may generate first data including at least one of a constant value or an immediate value. Further, processing unit 120 in FIG. 1 may perform step 902. The first data may be generated by a compiler. The first data may correspond to red (R) green (G) blue (B) alpha (A) (RGBA) data, and the constant value or immediate value may correspond to an alpha component of the RGBA data. In some aspects, the first data may be received from another GPU component.

At 904, the apparatus may generate a table including a plurality of entries to store data associated with at least one of a constant value or an immediate value. For example, as described in 720 of FIG. 7, GPU pipeline 702 may generate a table including a plurality of entries to store data associated with at least one of a constant value or an immediate value. Further, processing unit 120 in FIG. 1 may perform step 904. The table may be a render target (RT) alias table. In some instances, each entry of the plurality of entries in the table may correspond to data that is distinct from other entries of the plurality of entries in the table, such that one entry in the table may include data that is dissimilar to another entry in the table. The data in each of the plurality of entries may be associated with data transmitted from a streaming processor (SP) to another component in a GPU.

At 906, the apparatus may process, upon generating the table, first data including at least one of a constant value or an immediate value. For example, as described in 730 of FIG. 7, GPU pipeline 702 may process, upon generating the table, first data including at least one of a constant value or an immediate value. Further, processing unit 120 in FIG. 1 may perform step 906. The first data may be processed by a streaming processor (SP) or a high level sequencer (HLSQ) in a GPU. If the HLSQ processes the first data, the first data may be transmitted to the SP.

At 908, the apparatus may store, in the generated table, at least one of the constant value or the immediate value of the first data. For example, as described in 740 of FIG. 7, GPU pipeline 702 may store, in the generated table, at least one of the constant value or the immediate value of the first data. Further, processing unit 120 in FIG. 1 may perform step 908.

At 910, the apparatus may transmit, upon storing at least one of the constant value or the immediate value in the table, the table including the stored at least one of the constant value or the immediate value of the first data. For example, as described in 750 of FIG. 7, GPU pipeline 702 may transmit, upon storing at least one of the constant value or the immediate value in the table, the table including the stored at least one of the constant value or the immediate value of the first data. Further, processing unit 120 in FIG. 1 may perform step 910. The table including at least one of the constant value or the immediate value may be transmitted to at least one of a render backend (RB) or a vertex parameter cache (VPC) in a GPU.

At 912, the apparatus may skip processing, upon transmitting the table, at least one of the constant value or the immediate value of second data, where the second data is associated with at least one of the constant value or the immediate value. For example, as described in 760 of FIG. 7, GPU pipeline 702 may skip processing, upon transmitting the table, at least one of the constant value or the immediate value of second data, where the second data is associated with at least one of the constant value or the immediate value. Further, processing unit 120 in FIG. 1 may perform step 912.

At 914, the apparatus may process a portion of the second data, where the portion of the second data does not include at least one of the constant value or the immediate value. For example, as described in 770 of FIG. 7, GPU pipeline 702 may process a portion of the second data, where the portion of the second data does not include at least one of the constant value or the immediate value. Further, processing unit 120 in FIG. 1 may perform step 914. The portion of the second data may not include a preamble of the second data, such that the preamble of the second data may not be processed. Also, the first data and the second data may be processed in different portions of a graphics processing unit (GPU).

At 916, the apparatus may read, upon transmitting the table, a portion of the second data. For example, as described in 780 of FIG. 7, GPU pipeline 702 may read, upon transmitting the table, a portion of the second data. Further, processing unit 120 in FIG. 1 may perform step 916. The portion of the second data may not include at least one of the constant value or the immediate value. In some aspects, the second data may be stored in a buffer or memory.

At 918, the apparatus may remove, upon reading the portion of the second data, the table including the stored at least one of the constant value or the immediate value. For example, as described in 790 of FIG. 7, GPU pipeline 702 may remove, upon reading the portion of the second data, the table including the stored at least one of the constant value or the immediate value. Further, processing unit 120 in FIG. 1 may perform step 918.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for generating a table including a plurality of entries to store data associated with at least one of a constant value or an immediate value; means for processing, upon generating the table, first data including at least one of a constant value or an immediate value; means for storing, in the generated table, at least one of the constant value or the immediate value of the first data; means for transmitting, upon storing at least one of the constant value or the immediate value in the table, the table including the stored at least one of the constant value or the immediate value of the first data; means for skipping processing, upon transmitting the table, at least one of the constant value or the immediate value of second data, where the second data is associated with at least one of the constant value or the immediate value; means for processing a portion of the second data, where the portion of the second data does not include at least one of the constant value or the immediate value; means for reading, upon transmitting the table, a portion of the second data; means for removing, upon reading the portion of the second data, the table including the stored at least one of the constant value or the immediate value; and means for generating the first data including at least one of the constant value or the immediate value, where the first data is generated by a compiler.

The subject matter described herein can be implemented to realize one or more benefits or advantages. For instance, the described graphics processing techniques can be used by a GPU, a graphics processor, or some other processor that can perform graphics processing to implement the constant data storage techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize constant data storage in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing. The method includes generating a table including a plurality of entries to store data associated with at least one of a constant value or an immediate value; processing, upon generating the table, first data including at least one of a constant value or an immediate value; storing, in the generated table, at least one of the constant value or the immediate value of the first data; and transmitting, upon storing at least one of the constant value or the immediate value in the table, the table including the stored at least one of the constant value or the immediate value of the first data.

Aspect 2 is the method of aspect 1, where the table is a render target (RT) alias table.

Aspect 3 is the method of any of aspects 1 and 2, further including skipping processing, upon transmitting the table, at least one of the constant value or the immediate value of second data, where the second data is associated with at least one of the constant value or the immediate value.

Aspect 4 is the method of any of aspects 1 to 3, further including processing a portion of the second data, where the portion of the second data does not include at least one of the constant value or the immediate value.

Aspect 5 is the method of any of aspects 1 to 4, where the portion of the second data does not include a preamble of the second data, such that the preamble of the second data is not processed.

Aspect 6 is the method of any of aspects 1 to 5, where the first data and the second data are processed in different portions of a graphics processing unit (GPU).

Aspect 7 is the method of any of aspects 1 to 6, further including reading, upon transmitting the table, a portion of the second data.

Aspect 8 is the method of any of aspects 1 to 7, where the portion of the second data does not include at least one of the constant value or the immediate value.

Aspect 9 is the method of any of aspects 1 to 8, further including removing, upon reading the portion of the second data, the table including the stored at least one of the constant value or the immediate value.

Aspect 10 is the method of any of aspects 1 to 9, where each entry of the plurality of entries in the table corresponds to data that is distinct from other entries of the plurality of entries in the table, such that one entry in the table includes data that is dissimilar to another entry in the table.

Aspect 11 is the method of any of aspects 1 to 10, where the data in each of the plurality of entries is associated with data transmitted from a streaming processor (SP) to another component in a graphics processing unit (GPU).

Aspect 12 is the method of any of aspects 1 to 11, where the first data is processed by a streaming processor (SP) or a high level sequencer (HLSQ) in a graphics processing unit (GPU).

Aspect 13 is the method of any of aspects 1 to 12, where, if the HLSQ processes the first data, the first data is transmitted to the SP.

Aspect 14 is the method of any of aspects 1 to 13, further including generating the first data including at least one of the constant value or the immediate value, where the first data is generated by a compiler.

Aspect 15 is the method of any of aspects 1 to 14, where the first data corresponds to red (R) green (G) blue (B) alpha (A) (RGBA) data, and the constant value or immediate value corresponds to an alpha component of the RGBA data.

Aspect 16 is the method of any of aspects 1 to 15, where the table including at least one of the constant value or the immediate value is transmitted to at least one of a render backend (RB) or a vertex parameter cache (VPC) in a graphics processing unit (GPU).

Aspect 17 is an apparatus for graphics processing including at least one processor coupled to a memory and configured to implement a method as in any of aspects 1 to 16.

Aspect 18 is the apparatus of aspect 17, further including a transceiver coupled to the at least one processor.

Aspect 19 is an apparatus for graphics processing including means for implementing a method as in any of aspects 1 to 16.

Aspect 20 is a computer-readable medium storing computer executable code, the code when executed by at least one processor causes the at least one processor to implement a method as in any of aspects 1 to 16.

What is claimed is:

1. An apparatus for graphics processing, comprising:
   a memory; and
   at least one processor coupled to the memory and configured to:
      generate a table including a plurality of entries to store data associated with at least one of a constant value or an immediate value;
      process, upon generating the table, first data including at least one of a constant value or an immediate value;
      store, in the generated table, at least one of the constant value or the immediate value of the first data;
      transmit, upon storing at least one of the constant value or the immediate value in the table, the table including the stored at least one of the constant value or the immediate value of the first data;
      skip processing, upon transmitting the table, at least one of a constant value or an immediate value of second data, wherein the second data is associated with at least one of the constant value or the immediate value of the first data;
      process a portion of the second data, wherein the portion of the second data does not include at least one of the constant value or the immediate value of the second data;
      read the portion of the second data; and
      remove, upon reading the portion of the second data, the table including the stored at least one of the constant value or the immediate value.

2. The apparatus of claim 1, wherein the table is a render target (RT) alias table.

3. The apparatus of claim 1, wherein the portion of the second data does not include a preamble of the second data, such that the preamble of the second data is not processed.

4. The apparatus of claim 1, wherein the at least one processor is configured to process the first data and the second data in different portions of a graphics processing unit (GPU).

5. The apparatus of claim 1, wherein each entry of the plurality of entries in the table corresponds to data that is distinct from other entries of the plurality of entries in the table, such that one entry in the table includes data that is dissimilar to another entry in the table.

6. The apparatus of claim 3, wherein the data in each of the plurality of entries is associated with data transmitted from a streaming processor (SP) to another component in a graphics processing unit (GPU).

7. The apparatus of claim 1, wherein the at least one processor is configured to process the first data with a streaming processor (SP) or a high-level sequencer (HLSQ) in a graphics processing unit (GPU).

8. The apparatus of claim 7, wherein, if the at least one processor is configured to process the first data with the HLSQ, the first data is transmitted to the SP.

9. The apparatus of claim 1, wherein the at least one processor is further configured to:
generate the first data including at least one of the constant value or the immediate value, wherein the first data is generated by a compiler.

10. The apparatus of claim 1, wherein the first data corresponds to red (R) green (G) blue (B) alpha (A) (RGBA) data, and the constant value or the immediate value corresponds to an alpha component of the RGBA data.

11. The apparatus of claim 1, wherein the at least one processor is configured to transmit the table including at least one of the constant value or the immediate value to at least one of a render backend (RB) or a vertex parameter cache (VPC) in a graphics processing unit (GPU).

12. The apparatus of claim 1, further comprising a transceiver coupled to the at least one processor.

13. A method of graphics processing, comprising:
generating a table including a plurality of entries to store data associated with at least one of a constant value or an immediate value;
processing, upon generating the table, first data including at least one of a constant value or an immediate value;
storing, in the generated table, at least one of the constant value or the immediate value of the first data;
transmitting, upon storing at least one of the constant value or the immediate value in the table, the table including the stored at least one of the constant value or the immediate value of the first data;
skipping processing, upon transmitting the table, at least one of a constant value or an immediate value of second data, wherein the second data is associated with at least one of the constant value or the immediate value of the first data;
processing a portion of the second data, wherein the portion of the second data does not include at least one of the constant value or the immediate value of the second data;
reading the portion of the second data; and
removing, upon reading the portion of the second data, the table including the stored at least one of the constant value or the immediate value.

14. The method of claim 13, wherein the table is a render target (RT) alias table.

15. The method of claim 13, wherein the portion of the second data does not include a preamble of the second data, such that the preamble of the second data is not processed.

16. The method of claim 13, wherein the first data and the second data are processed in different portions of a graphics processing unit (GPU).

17. The method of claim 13, wherein each entry of the plurality of entries in the table corresponds to data that is distinct from other entries of the plurality of entries in the table, such that one entry in the table includes data that is dissimilar to another entry in the table.

18. The method of claim 17, wherein the data in each of the plurality of entries is associated with data transmitted from a streaming processor (SP) to another component in a graphics processing unit (GPU).

19. The method of claim 13, wherein the first data is processed by a streaming processor (SP) or a high-level sequencer (HLSQ) in a graphics processing unit (GPU).

20. The method of claim 19, wherein, if the HLSQ processes the first data, the first data is transmitted to the SP.

21. The method of claim 13, further comprising:
generating the first data including at least one of the constant value or the immediate value, wherein the first data is generated by a compiler.

22. The method of claim 13, wherein the first data corresponds to red (R) green (G) blue (B) alpha (A) (RGBA) data, and the constant value or the immediate value corresponds to an alpha component of the RGBA data.

23. The method of claim 13, wherein the table including at least one of the constant value or the immediate value is transmitted to at least one of a render backend (RB) or a vertex parameter cache (VPC) in a graphics processing unit (GPU).

24. An apparatus for graphics processing, comprising:
means for generating a table including a plurality of entries to store data associated with at least one of a constant value or an immediate value;
means for processing, upon generating the table, first data including at least one of a constant value or an immediate value;
means for storing, in the generated table, at least one of the constant value or the immediate value of the first data;
means for transmitting, upon storing at least one of the constant value or the immediate value in the table, the table including the stored at least one of the constant value or the immediate value of the first data;
means for skipping processing, upon transmitting the table, at least one of a constant value or an immediate value of second data, wherein the second data is associated with at least one of the constant value or the immediate value of the first data;
means for processing a portion of the second data, wherein the portion of the second data does not include at least one of the constant value or the immediate value of the second data;
means for reading the portion of the second data; and
means for removing, upon reading the portion of the second data, the table including the stored at least one of the constant value or the immediate value.

25. A non-transitory computer-readable medium storing computer executable code for graphics processing, the code when executed by a processor causes the processor to:
generate a table including a plurality of entries to store data associated with at least one of a constant value or an immediate value;
process, upon generating the table, first data including at least one of a constant value or an immediate value;
store, in the generated table, at least one of the constant value or the immediate value of the first data;
transmit, upon storing at least one of the constant value or the immediate value in the table, the table including the stored at least one of the constant value or the immediate value of the first data;

skip processing, upon transmitting the table, at least one of a constant value or an immediate value of second data, wherein the second data is associated with at least one of the constant value or the immediate value of the first data;

process a portion of the second data, wherein the portion of the second data does not include at least one of the constant value or the immediate value of the second data;

read the portion of the second data; and remove, upon reading the portion of the second data, the table including the stored at least one of the constant value or the immediate value.

\* \* \* \* \*